INVENTOR.
BERDJ C. KALUSTYAN

United States Patent Office 3,135,160
Patented June 2, 1964

3,135,160
OPTICAL SYSTEM FOR TRANSPARENCY PROJECTION USING POINT LIGHT SOURCE AND COMPOUND NEGATIVE LENSES
Berdj C. Kalustyan, Bergenfield, N.J., assignor, by mesne assignments, to the United States of America as represented by the Secretary of the Navy
Filed Mar. 15, 1961, Ser. No. 96,055
2 Claims. (Cl. 88—24)

This invention relates generally to the art of picture projection, and more particularly ot the system of optics embodied in projection apparatus designed for use with color-slides, photographic film and other transparencies.

Although the present invention may be embodied in color-slide projectors generally, its conception is particularly concerned with the use thereof in a so-called point source projection system which advantageously finds application in student pilot training and/or briefing devices so as to present to the student a visual display or picture of a terrain or other object in a manner which simulates the effect of a vehicle in motion. By virtue of the point source projection system a non-programmed, wide angle, three-dimensional visual display or picture in color and with satisfactory perspective is effectively achieved. The point source projection system has application in other areas as well where a visual display is required for a specific purpose.

Briefly, in the point source projection system, the projecting element is a point source which emits a solid cone of light flux so that a transparency positioned in the path of the light flux is projected onto a reflecting screen for viewing purposes. The transparency which depicts a specific area or terrain to a reduced scale, may be and preferably is in color, and three-dimensional objects may be mounted in relief on said transparency so that said objects are projected in proper perspective upon the viewing screen. To give the illusion of motion to the observer or student pilot, the transparency is moved relative to the light source or vice versa, for example, to give the illusion of changes in altitude, the light source and transparency are moved relatively farther apart to depict increased altitude, and are moved relatively closer together to depict decreased altitude.

It is the main object of the present invention to provide for use particularly in a point source projection system for transparencies a novel optical system which will advantageously provide the above-described point source of light in a relatively simple and inexpensive manner.

Another object of the invention is to provide for use particularly, but not exclusively, in a point source projection system for transparencies a novel optical system consisting of an absolute minimum number of component parts and which are relatively simple in construction and inexpensive to manufacture and supply.

Another object is to provide for use particularly, but not exclusively, in a point source projection system for transparencies a novel optical system including a compound lens system which will effectively demagnify a relatively large diameter real light source in a plurality of stages, whereby the ultimate minute virtual image of said light source resulting from the final stage of such demagnification appears to be the light source and may be advantageously and effectively utilized as the source to adjust for distance between the light and the transparency.

Another object is to provide for use in transparency projection apparatus a novel optical system which utilizes a light source and a compound lens system located at one side only of a transparency for effectively projecting said transparency onto a viewing screen.

Other objects and many of the attendant advantages of this invention will be readily appreciated as the same becomes better understood by reference to the following detailed description when considered in connection with the accompanying drawings wherein.

Figure 1:
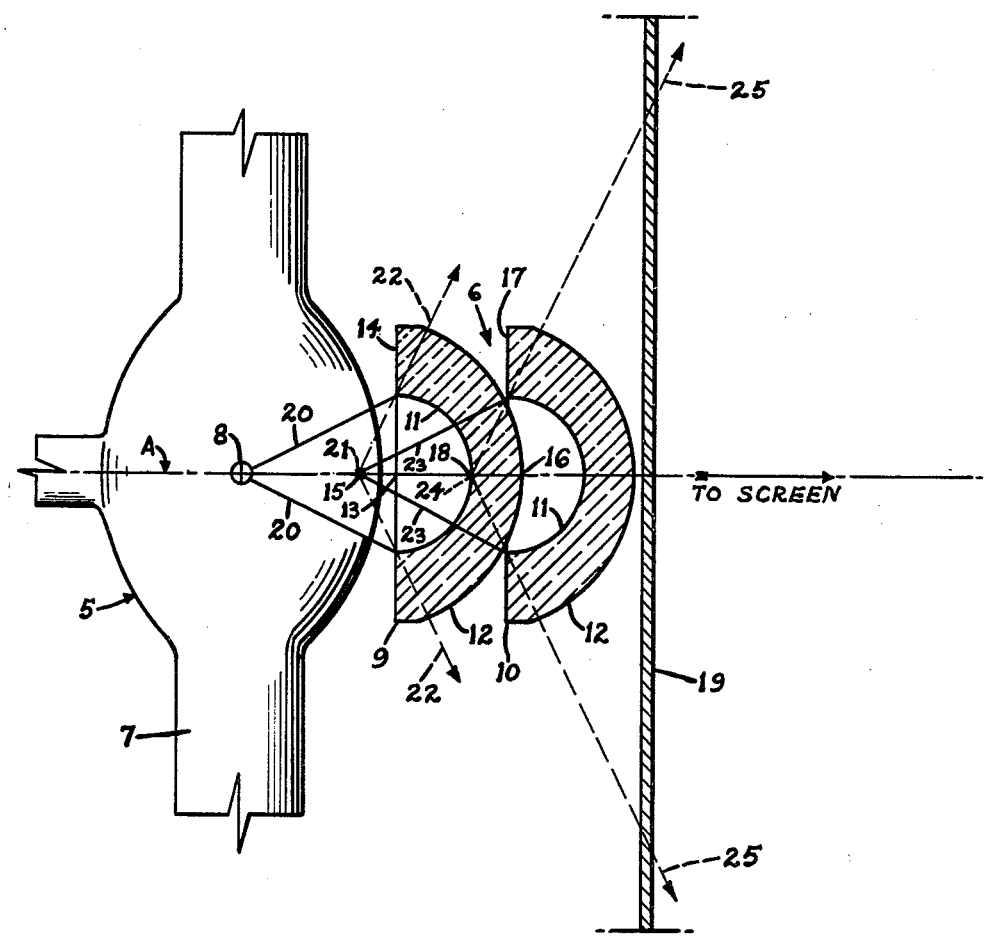
FIG. 1 illustrates, partly in section and on an enlarged and exaggerated scale, the optical system of the invention.

Referring to the figures, the point source projection system for transparencies comprises a light source indicated generally at 5, and a compound lens system indicated generally at 6, all of which is arranged as a unit at one side of the transparency to be projected onto a viewing screen (not shown).

The light source 5 is in the form of an arc lamp 7 which is capable of producing light of a relatively high photometric brightness or luminance. The lamp 7 is positioned so that the real source of light indicated at 8 is located directly on the line of the optical axis A of the system.

The arc lamps of the desired high light intensity which are commercially available for use in the present system, produce such light which is at the source thereof of a relatively large diameter. One such arc lamp which is relatively small in overall size and is capable of use in the present system is manufactured by Osram and is identified as Osram HBO–109. The latter lamp is capable of continuously delivering light of approximately 350–400 metered candle power and of an approximate diameter of .014–.016 inch at the source thereof.

In a point source projection system in particular, the projection of the transparency, as well as the definition of the projected picture of image, is wholly dependent upon a light source which is not only of a relatively high intensity, but which is at the source thereof also of a minute diameter or practically point size. The smaller the diameter of the light source, the better is the projection and the projected picture definition. Accordingly, the lens system 6 which is preferably located relatively close to the lamp 7 and symmetrically at opposite sides of the optical axis A, novelly serves to effectively and advantageously provide such light source of a minute diameter or substantially point source. This lens system 6 comprises compound lenses 9 and 10, two only being herein shown, which are constructed to effectively demagnify the light source 8 in a plurality of stages, with the result that virtual images of decreasing diameters of said light source are effectively obtained on the optical axis A, with the image resulting from the last or final stage of demagnification being of a minute diameter or substantially point size. While such demagnification of the real light source 8 is obtained at the expense of a reduction in total light available from said source, the latter is of sufficient light intensity to enable said demagnification.

Each lens 9 and 10, constructed as herein shown, is a negative meniscus-shaped element of solid, clear optical glass having a concave spherical surface 11 facing in the direction of the lamp 7, and a convex spherical surface 12 facing in the direction of the transparency to be projected. The center of curvature of the concave spherical surface 11 of the rear meniscus lens 9 is located on the optical axis A at the point 13 which is in exact alignment with the rear flat vertical face 14 of said lens. The center of curvature of the convex spherical surface 12 of the rear meniscus lens 9 is also located on the optical axis A, but is spaced rearwardly a predetermined distance from the point 13 as indicated at 15. The center of curvature of the concave spherical surface 11 of the front or succeeding meniscus lens 10 is located on the optical axis A at the point 16, thus indicating that said lens is located relatively close to the rear or preceding lens 9, said point 16 being in exact alignment with the rear vertical face 17 of said front lens. The center of curvature of the convex spherical surface 12 of the front lens 10 is also located on the optical axis A, but is spaced rearwardly a predetermined distance from the point 16 as indicated at 18. The virtual image of the first lens serves as the object of the second lens.

Figure 2:
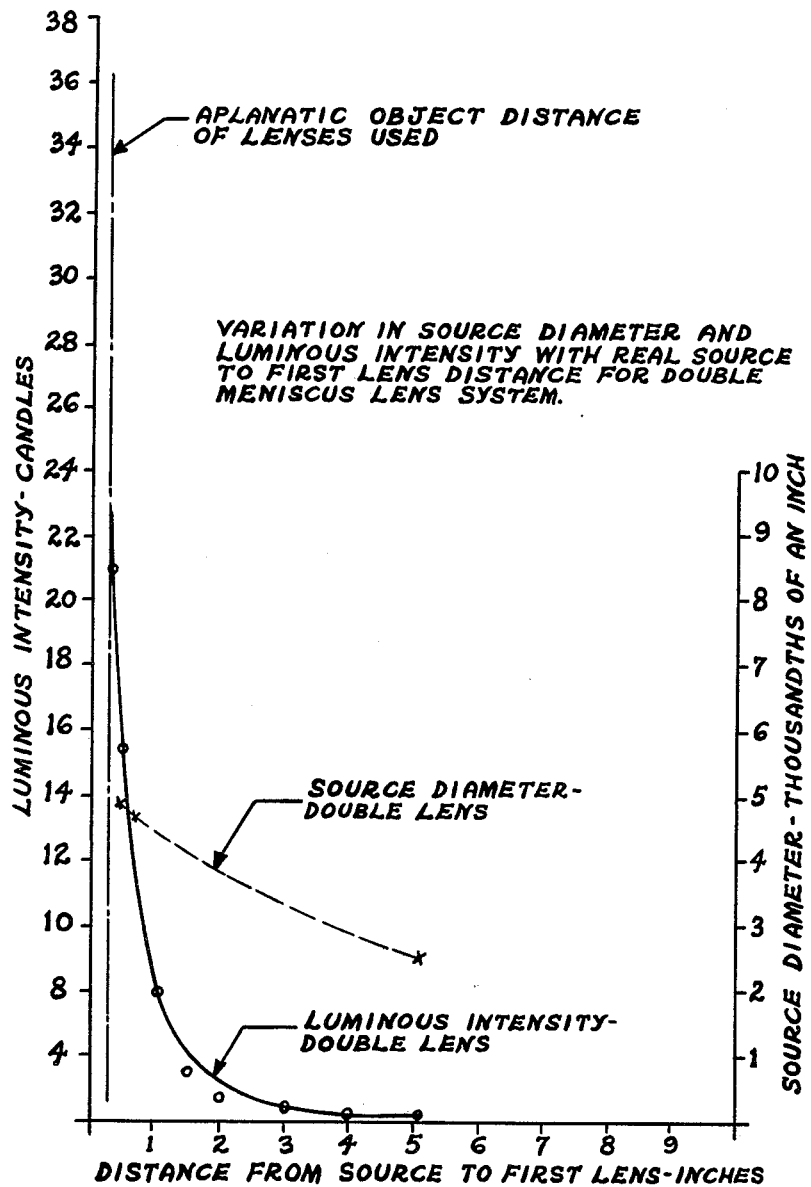
FIG. 2 is a graphic presentation of the variation in luminous intensity and source diameter.
Figure 3:
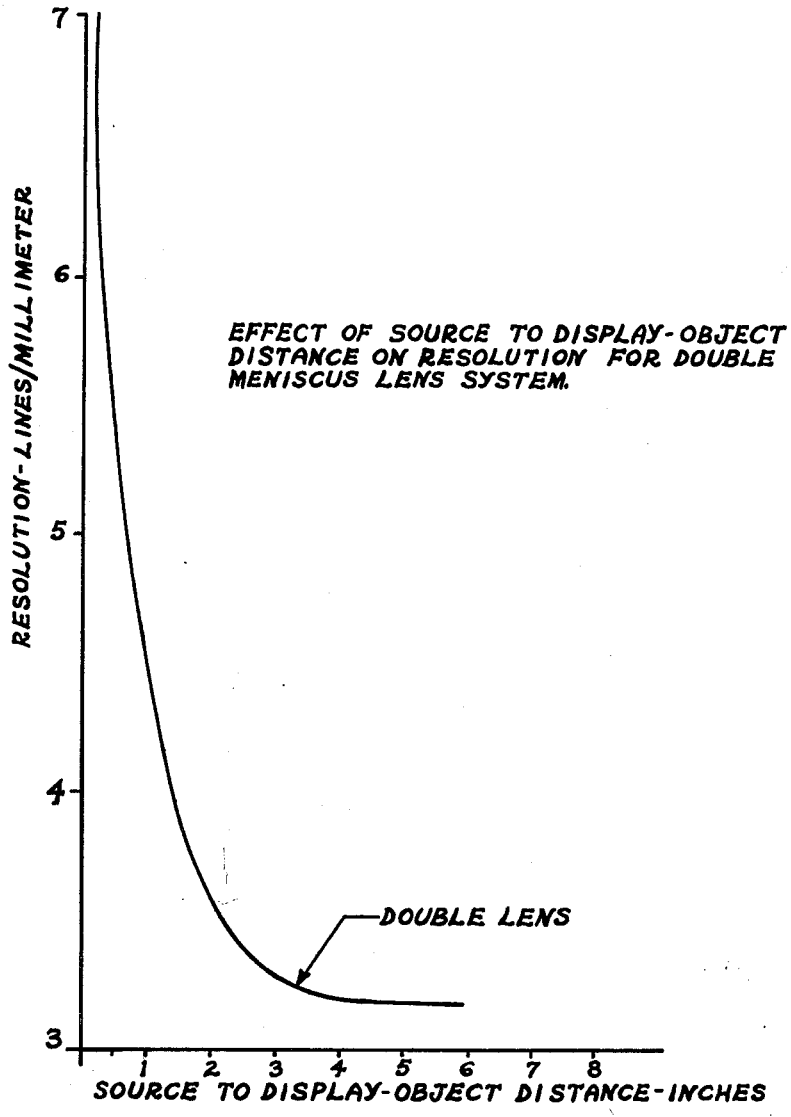
FIG. 3 is a graphic pictorization of the effects on the resolution of the display image.

FIG. 2 is a graphic illustration of the variation in luminous intensity and in source diameter for the double meniscus lens system when distance between the real source lamp and the first lens is varied. As distance increases, there is a sharp loss of luminous intensity. The close proximity of the lens system 6 to the source 5 takes full advantage of the source. In FIG. 3, the effect on the resolution of the display image is illustrated. By using a double meniscus lens system, the resolution is greatly improved. This is particularly possible because of the close distance relationship between the point-source 5 to display-object 6. The optimum results are obtained at a distance less than 1.4 inches.

In the system just described, a transparency 19 is positioned at a selected point relatively close to and forwardly of the front meniscus lens 10 and such that it intersects the optical axis A and is disposed in the path of the light flux emanating from said lens. The light flux from the real light source 8 of the energized lamp 7 is received by the rear meniscus lens 9, and since said lens is located quite close to said lamp, the maximum light flux is collected by said rear lens, as indicated by the full angular lines 20, 20. The light flux thus collected by the rear meniscus lens 9 is then demagnified by said lens, resulting in a virtual image 21 of a reduced diameter of the real light source 8, such demagnification and virtual image occurring, in the illustrated embodiment, substantially at the point 15 on the optical axis A. The collected and demagnified light flux is then bent by the rear meniscus lens 9 so that the rays of light diverge from the virtual image 21 and pass through said rear lens in the form of a solid wide angle cone of light as indicated by the broken angular lines 22, 22. The light flux appearing to be emanating from the virtual image 21 of reduced diameter and from the rear meniscus lens 9 is then received by the front or succeeding meniscus lens 10, and since the latter is located quite close to the rear or preceding lens 9, the maximum light flux is collected by said front lens, as indicated by the full angular lines 23, 23. The light flux thus collected by the front lens 10 is then further demagnified by said lens, resulting in a second virtual image 24 of the real light source 8, said second virtual image being further reduced in diameter and being substantially of a minute diameter or point size, and occurring, in the illustrated embodiment, as the point 18 on the optical axis A. The light flux thus collected and further demagnified by the front lens 10 is then bent by said front lens so that the light rays diverge from the last or final virtual image 24 and pass through the front lens 10 in the form of a solid wide angle cone of light as indicated by the broken angular lines 25, 25, said cone of light intersecting the optical axis A and passing through the adjacent transparency 19, thus effectively providing the illumination used for projecting said transparency onto a viewing screen (not shown) which is located a suitable distance forwardly of the transparency, such projection resulting in a wide angle coverage and good definition and luminance of the projected picture or image on said screen. This is possible because of the point light source technique. No other optical system is needed.

There is thus provided a novel simplified optical system which, in the illustrated embodiment, utilizes compound negative meniscus lenses for effectively projecting transparencies onto a viewing screen. By virtue of the negative meniscus lenses a real light source of a relatively large diameter is effectively and advantageously demagnified in a plurality of stages so that an ultimate virtual image of said light source of a minute diameter or substantially point size resulting from the last or final stage of demagnification effectively serves as the projection light source. The novel simplified optical system enables wide angle projection of transparencies onto a viewing screen with good picture definition and luminance and advantageously provides for use thereof in a point source projection system for transparencies.

Although only a single embodiment of the present invention is illustrated in the accompanying drawings and described in detail in the foregoing specification, it is to be expressly understood that the invention is not limited to said embodiment or to the particular use thereof in a point source projection system. Modifications will become apparent to those skilled in the art. For example, three or more negative meniscus lenses may be employed in order to obtain additional demagnification of the virtual image of the real light source. Additionally, the wide angle of coverage of the compound lenses 9 and 10 may be increased as desired by simply increasing the radius of the convex surface 12 of one or both of said lenses to convert said convex surface to the maximum limit of a planar surface.

Obviously many modifications and variations of the present invention are possible in the light of the above teachings. It is therefore to be understood that within the scope of the appended claims the invention may be practiced otherwise than as specifically described.

What is claimed is:

1. An optical system for use in the projection of transparencies onto a viewing screen, comprising a transparency a relatively high intensity continuous point light source of illumination, and compound projection lens means positioned between said transparency and point light source and in close proximity to said light source and wholly between the latter and the transparency to be projected, said lens means consisting of at least two closely associated negative meniscus-shaped lenses intersecting the optical axis of said optical system and each having a concave spherical surface facing in the direction of said light source and a convex spherical surface facing in the direction of the transparency.

2. An optical system for use in transparency projection apparatus, comprising a transparency a lamp capable of producing a point source light of a relatively high intensity, said light being located on the optical axis of said system and being of a relatively large diameter, and projection lens means intersecting said optical axis and located in close proximity to said lamp to receive the light flux from said light source and demagnify the same in a plurality of stages so as to provide on said optical axis and between said lamp and lens means an ultimate virtual image of a minute diameter of said light source, said lens means comprising at least two closely associated lenses each having a concave spherical surface facing said lamp, the center of curvature of said concave surface of each of said lenses being located at a predetermined position on said optical axis, and said lenses each having another surface facing away from said lamp and formed to effect projection of light rays therethrough and such that the light rays diverging from said virtual image and emanating from the lens remote from said lamp will effectively cover a relatively large area of a transparency positioned in projecting relation to said latter lens.

References Cited in the file of this patent

UNITED STATES PATENTS

| | | |
|---|---|---|
| 976,143 | Bostock | Nov. 22, 1910 |
| 2,165,305 | Ruths | July 11, 1939 |
| 2,225,485 | Rantsch | Nov. 22, 1940 |

FOREIGN PATENTS

| | | |
|---|---|---|
| 620,538 | Germany | Oct. 23, 1935 |